| United States Patent [19] | [11] Patent Number: 4,594,396 |
| Berta | [45] Date of Patent: Jun. 10, 1986 |

[54] CROSS-LINKING HALOGENATED POLYMERS

[75] Inventor: Dominick A. Berta, Wilmington, Del.

[73] Assignee: Hercules Incorporated, Wilmington, Del.

[21] Appl. No.: 678,729

[22] Filed: Dec. 5, 1984

[51] Int. Cl.⁴ .......................... C08F 8/24; C08C 19/22
[52] U.S. Cl. .................................... 525/352; 524/401; 524/424; 524/425; 524/426; 524/433; 525/343; 525/346; 525/403
[58] Field of Search ............. 525/403, 352, 346, 343; 524/433, 401, 424, 425, 426

[56] References Cited

U.S. PATENT DOCUMENTS

| 3,801,517 | 4/1974 | Richwine | 260/2 A |
| 3,976,625 | 8/1976 | Starmer | 525/352 |
| 4,128,510 | 12/1978 | Richwine | 528/36 |
| 4,268,640 | 5/1981 | Matoba | 525/352 X |
| 4,288,576 | 9/1981 | Richwine | 525/349 |

FOREIGN PATENT DOCUMENTS 58-142937  8/1983  Japan .

*Primary Examiner*—Theodore E. Pertilla
*Attorney, Agent, or Firm*—William E. Player; Marion C. Staves

[57] ABSTRACT

A cure system for halogen-containing polymers that comprises a thiourea derivative, a thiuram sulfide and an inorganic base yields stable cross-linked products with useful properties when incorporated into normal vulcanization procedures.

8 Claims, No Drawings

CROSS-LINKING HALOGENATED POLYMERS

This invention relates to cross-linking halogen-containing polymers. Particularly, this invention relates to a process of cross-linking halogen-containing polymers with an aliphatic substituted thiourea, a Group Ia or IIa oxide, hydroxide or carbonate, and a thiuram sulfide in normal vulcanization procedures. Group Ia and Group IIa as used herein, including the claims, refers to the elements combined in Groups Ia and IIa of the long form of the Mendeleeff Periodic Table as recorded in Moeler, Therald, Inorganic Chemistry (John Wiley and Sons, 1959), p. 123.

BACKGROUND OF THE INVENTION

Processes of cross-linking polymers can involve the use of cure systems comprising various cross-linking agents, accelerators, and acid acceptors. The agents perform the actual cross-linking, the accelerators increase the rate of cross-linking, and the acid acceptors scavenge ions resulting from the cross-linking reaction thereby enhancing accelerator performance.

A cure system used in cross-linking halogen-containing polymers that uses as its major components ethylene thiourea as a cross-linking agent, and red lead ($Pb_3O_4$) as an accelerator is known in the art. This system yields stable vulcanizates possessing good physical properties. However, red lead is toxic, and, therefore, a cure system without red lead is preferable.

Cure systems using polyoxyethylene compounds as cross-linking agents with thiuram sulfides, particularly tetramethylthiuram disulfide, as accelerators and metal compounds, particularly magnesium oxide, as acid acceptors has been reported in Japanese Patent OSAKA SODA KK 18.02.82-JP-025626. However, a cure system that uses only a thiuram sulfide, such as tetramethylthiuram disulfide, and a metal compound, such as magnesium oxide, cures a halogen-containing polymer slowly and results in a vulcanizate with non-advantageous properties, e.g., low modulus and low elongation.

SUMMARY OF THE INVENTION

It has now been discovered that halogen-containing polymers can be cross-linked to yield stable vulcanizates with good physical properties by using a thiourea derivative as a cross-linking agent, an inorganic base, as an acid acceptor and a thiuram sulfide as an accelerator in normal vulcanization procedures.

Accordingly, this invention relates to a process of cross-linking halogen-containing polymers by using a cure system comprising: (1) an aliphatic substituted thiourea, (2) an inorganic base selected from the group consisting of a Group Ia oxide, a Group Ia hydroxide, a Group Ia carbonate, a Group IIa oxide, a Group IIa hydroxide, and a Group IIa carbonate; and (3) a thiuram sulfide selected from the group consisting of an alkylthiuram sulfide and an arylthiuram sulfide.

DESCRIPTION OF THE PREFERRED EMBODIMENTS

The halogen-containing polymers to be cross-linked in accordance with this invention may be saturated or unsaturated and contain at least about 1.0% and preferably at least about 5.8% halogen by weight.

Typical halogen-containing polymers used in accordance with this invention are epichlorohydrin homopolymers, epichlorohydrin-ethylene oxide copolymers, epichlorohydrin-propylene oxide copolymers, epichlorohydrin-allylglycidyl ether copolymers, epichlorohydrin-ethylene oxide-allylglycidyl ether terpolymers, epichlorohydrin-propylene oxide-allylglycidyl ether terpolymers, epiflourohydrin homopolymers, epiflourohydrin-ethylene oxide copolymers, epiflourohydrin-propylene oxide copolymers, epiflourohydrin-ethylene oxide-allylglycidyl ether terpolymers, epiflourohydrin-propylene oxide-allylglycidyl ether terpolymers, poly (vinyl chloride), poly(vinyl chloride)-ethylene oxide copolymer, chlorinated polyethylene, polychloroprene, chloronated butyl rubber and bromonated butyl rubber.

Typical aliphatic substituted thioureas used in accordance with this invention are trimethythioruea, ethylene thiourea, 1,3-diethylthiourea, 1,3-dibutyl-thiourea, and dimethylethylthiourea. Ethylene thiourea is preferable.

The inorganic bases used in accordance with this invention are Group Ia or IIa oxides, hydroxides, or carbonates such as magnesium oxide, potassium hydroxide, calcium carbonate, or magnesium carbonate. The preferred inorganic base is magnesium oxide.

Thiuram sulfides used in accordance with this invention are of the formula $(R_2NCHS)_2S_x$ wherein X is an integer greater than or equal to 1, and R is an alkyl or aryl group such as methyl, ethyl, butyl or phenyl. Typical of the thiuram sulfides are tetramethylthiuram disulfide, tetraethylthiuram disulfide, tetramethylthiuram monosulfide, tetrabutylthiuram monosulfide, dipentamethylenethiuram hexasulfide, and N,N'-dimethyl-N,N'-diphenylthiuram monosulfide.

This invention can also be used to cross-link blends of halogen-containing polymers and blends of halogen-containing polymers and non-halogen-containing polymers. The only requirement is that a sufficient amount of halogen-containing polymer be present to effect cross-linking, i.e., halogen must be present in an amount at least 1% by weight based upon the total weight of the polymer blend.

Quantities of the cure system components, i.e., accelerator, acid acceptor, and cross-linking agent, to be used in accordance with this invention can vary. Based on the weight of the halogen-containing polymer, the quantity of the cross-linking agent varies between about 0.1% and about 10.0% and preferably between about 0.5% and about 5.0%, the quantity of the inorganic base varies between about 0.25% and about 10.0%, preferably between about 0.5% and about 5.0%, and more preferably between about 1.0% and about 2.0%, and the quantity of the accelerator varies between about 0.1% and about 20.0%, preferably between about 0.5% and about 10.0%, and more preferably between about 1.0% and about 5.0%. The extent of cross-linkage depends upon the cross-linking agent selected and the quantity of cross-linking agent used.

The inorganic base may also be used as a filler. Based on the weight of the halogen-containing polymer, the quantity of the inorganic base that is used as an acid acceptor and a filler varies between about 0.25% and about 100%, preferably between about 0.5% and about 50%, and more preferably between about 1.0% and about 20.0%.

Any state-of-the-art method can be used to blend the halogen-containing polymer with the cure system components. Conventional rubber milling and mixing in a Banbury mixer are methods that distribute the cure system components uniformly throughout the polymer and effect uniform cross-linking when the blend is heated. Preferably, milling should be performed between 50° C. and 90° C., but unless a large amount of accelerator is used, the blends remain scorch-resistant below about 125° C. Other methods of combining the polymer with the cure system components are known to those skilled in the art.

Cross-linking of the halogen-containing polymer occurs between about 140° C. and about 260° C., preferably between about 150° C. and about 225° C., and more preferably between about 150° C. and about 205° C. The time needed to effect the cross-linking varies inversely with the temperature and ranges from about 5 seconds to about 10 hours. The cross-linking can occur in air in an open container, in a heat transfer medium at normal atmospheric pressure, or, preferably, in a metal mold under at least about 500 p.s.i pressure or in a steam autoclave at the desired pressure and temperature.

Other ingredients, e.g., extenders, fillers, pigments, antioxidants, plasticizers, and softeners that are used in rubber vulcanization, can be added to this cure system. Good results can be obtained, as in rubber compounding, by adding reinforceing agents, especially carbon black, which increase tensile strength, stiffness, and resistance to abrasion. Processing agents such as sorbitan monostearate extend scorch safety, i.e., the time available to work the polymer before cross-linking begins.

The following examples illustrate the superior scorch safety and the good physical properties of cured vulcanizates obtained by using this invention as compared with other methods of curing. Examples 2, 7, 8 and 9–15 represent the method of this invention, and Examples 1, 3, 4, 5 and 6 are for comparison.

In the following Examples, the ingredients are combined in the order listed in a Banbury Mixer. To determine cure rate, the combined ingredients are heated at 160° C. for 60 minutes in an Oscillating Disk Rheometer (ODR) (American Society for Testing and Materials, ASTM, D 2084-71 T). The combined ingredients are prepared for Tension Testing and Shore A Hardness by curing at 160° C. in a typical ASTM mold and tested in accordance with ASTM, D 142-68 and ASTM, D 2240-68 respectively at time of curing and after ageing for 7 days at 125° C. Mooney Scorch is determined by using the shearing disk viscometer (ASTM, D 1646-68).

| Ingredients | Examples 1–4 Parts | | | |
|---|---|---|---|---|
| | Ex. 1 | Ex. 2 | Ex. 3 | Ex. 4 |
| epichlorohydrin-propylene oxide copolymer (11.5% chlorine by weight) | 100.0 | 100.0 | 100.0 | 100.0 |
| HAF[1] carbon black (reinforcing agent) | 50.0 | 50.0 | 50.0 | 50.0 |
| sorbitan monostearate (processing aid) | 5.0 | 5.0 | 5.0 | 5.0 |
| nickel dibutyl dithiocarbamate (antioxidant) | 1.0 | 1.0 | 1.0 | 1.0 |
| magnesium oxide (acid acceptor) | 5.0 | 5.0 | — | — |
| red lead (Pb$_3$O$_4$) (accelerator) | — | — | 5.0 | 5.0 |
| dipentamethylenethiuram hexasulfide (accelerator) | — | 1.0 | — | 1.0 |
| ethylene thiourea (cross-linking agent) | 2.25 | 2.25 | 2.0 | 2.0 |

[1]High Abrasion Furnace Black

The crosslinked products from the above formulations have the following physical properties:

| | Examples 1–4 | | | |
|---|---|---|---|---|
| | Ex. 1 | Ex. 2 | Ex. 3 | Ex. 4 |
| Mooney Scorch (@ 121.11° C.) (ASTM D 1646-68) | | | | |
| Minimum Viscosity (Mooney units) | 38.73 | 36.5 | 38.5 | 38.2 |
| Time in minutes for 3 unit rise in viscosity | 7.5 | 12.5 | 5.0 | 7.0 |
| Time in minutes for 5 unit rise in viscosity | 8.0 | 18.5 | 6.5 | 8.5 |
| Time in minutes for 10 unit rise in viscosity | 9.6 | 24.0 | 8.0 | 10.0 |
| Tension Testing (ASTM D 142-68) | | | | |
| 100% Modulus (tensile strength @ 100% elongation) (p.s.i.) | 210 | 330 | 290 | 260 |
| Tensile Strength (p.s.i.) | 1480 | 1690 | 1790 | 1520 |
| % Elongation | 960 | 510 | 740 | 790 |
| Shore A Hardness (ASTM D 2240-68) | 60 | 70 | 69 | 66 |
| Tension Testing (Aged 7 days @ 125° C.) (ASTM D 142-68) | | | | |
| 100% Modulus (tensile strength @ 100% elongation) (p.s.i.) | 340 | 620 | 550 | 510 |
| Tensile Strength (p.s.i.) | 860 | 1290 | 1260 | 1180 |
| % Elongation | 250 | 230 | 270 | 280 |
| Shore A Hardness (aged 7 days @ 125° (ASTM D 2240-68) | 71 | 82 | 81 | 78 |
| ODR (ASTM D 2084-71 T) | | | | |
| Minimum Torque (inch-pounds) | 18 | 14 | 49 16 | 12.5 |
| Highest Torque/Type (inch-pounds) | 35/M$_H$ | 78/M$_H$ | 64/M$_H$ | 52/M$_H$ |
| Scorch Time (t$_s$2) (minutes to torque increase of 2 inch-pounds) | 3.5 | 3.0 | 2.5 | 3.0 |
| Cure Time (t$_c$90) (minutes to 90% of full torque development) | 25 | 40 | 35 | 40 |

In the foregoing Examples, the results of Mooney Scorch testing show that this invention (Example 2) has superior scorch safety over: the red lead and ethelene thiourea cure system (Example 3): a cure system similar to this invention, but without the thiuram accelerator (Example 1): and a cure system similar to this invention, but without the group Ia or IIa acid acceptor but with red lead (Example 4). Also, the good physical properties obtained using the red lead/ethylene thiourea cure system are obtained using this invention.

Examples 5–9, illustrate further the superior scorch safety realized by using this invention over other methods of curing, and the good physical properties of cured vulcanizates obtained thereby.

|  | Examples 5-9 Parts | | | | |
|---|---|---|---|---|---|
| Ingredients | Ex. 5 | Ex. 6 | Ex. 7 | Ex. 8 | Ex. 9 |
| epichlorohydrin-ethylene oxide copolymer (24.8% chlorine by weight) | 100 | 100 | 100 | 100 | 100 |
| HAF[1] carbon black (reinforcing agent) | 50 | 50 | 50 | 50 | 50 |
| stearic acid (processing aid) | 1.0 | 1.0 | 1.0 | 1.0 | 1.0 |
| nickel dibutyl dithiocarbamate (antioxidant) | 1.0 | 1.0 | 1.0 | 1.0 | 1.0 |
| magnesium oxide (acid acceptor) | — | 5.0 | 5.0 | 5.0 | 5.0 |
| red lead ($Pb_3O_4$) (accelerator) | 5 | — | — | — | — |
| dipentamethylenethiuram hexasulfide (accelerator) | — | — | 1.0 | 1.0 | — |
| tetramethylenethiuram disulfide (accelerator) | — | — | — | — | 1.5 |
| ethylene thiourea (cross-linking agent) | 2.0 | 2.0 | 2.0 | 1.5 | 2.0 |
| The cross-linked products from the above formulations have the following physical properties: | | | | | |
| Mooney Scorch (@ 121.11° C.) (ASTM D 1646) | | | | | |
| Minimum Viscosity (Mooney units) | 31.9 | 30.6 | 28 | 27.8 | 27.2 |
| Time in minutes for 3 point rise in viscosity | 4.0 | 5.2 | 12.0 | 12.6 | 12.5 |
| Time in minutes for 5 point rise in viscosity | 4.3 | 6.4 | 13.7 | 14.6 | 14.8 |
| Time in minutes for 10 point rise in viscosity | 5.8 | 8.0 | 15.5 | 17.25 | 17.6 |
| Tension Testing (ASTM D 142-68) | | | | | |
| 100% Modulus (tensile strength @ 100% elongation) (p.s.i.) | 640 | 470 | 780 | 650 | 600 |
| Tensile Strength (p.s.i.) | 2270 | 1450 | 1920 | 2130 | 1960 |
| % Elongation | 400 | 390 | 240 | 360 | 360 |
| Shore A Hardness (ASTM D 2240-68) | 77 | 70 | 77 | 75 | 74 |
| Tension Testing (aged 7 days @ 125° C.) (ASTM D 142) | | | | | |
| 100% Modulus (tensile strength @ 100% elongation) | 1450 | 720 | 1180 | 1170 | 1120 |
| Tensile Strength (p.s.i.) | 2760 | 1500 | 1460 | 1880 | 1650 |
| % Elongation | 180 | 200 | 140 | 150 | 130 |
| Shore A Hardness (aged 7 days @ 125° C.) (ASTM D 2240-68) | 88 | 84 | 89 | 88 | 87 |
| ODR (ASTM D 2048-71 T) | | | | | |
| Minimum Torque (inch-pounds) | 14 | 14 | 12 | 10.8 | 10.5 |
| Highest Torque/Type (inch-pounds) | 105/$M_H$ | 67/$M_H$ | 130/$M_H$ | 102/$M_H$ | 94/$M_H$ |
| Scorch Time ($t_{s2}$) (minutes to torque increase of 2 inch pounds) | 1.3 | 2.0 | 2.5 | 2.5 | 2.9 |
| Cure Time ($t_c90$) (minutes to 90% of full torque development) | 28 | 30 | 30 | 29 | 25 |

[1]High Abrasion Furnace Black

Examples 10-15 illustrate various formulas usable in accordance with this invention and the scorch safety and good physical properties of cured vulcanizated obtained thereby.

|  | Ex. 10 | Ex. 11 | Ex. 12 | Ex. 13 | Ex. 14 | Ex. 15 |
|---|---|---|---|---|---|---|
| epichlorinethylene oxide copolymer (24.8% chlorine by weight) | 100 | 100 | 100 | 100 | 100 | 100 |
| HAF[1] carbon black (reinforcing agent) | 50 | 50 | 50 | 50 | 50 | 50 |

|  | Ex. 10 | Ex. 11 | Ex. 12 | Ex. 13 | Ex. 14 | Ex. 15 |
| --- | --- | --- | --- | --- | --- | --- |
| stearic acid (processing aid) | 1.0 | 1.0 | 1.0 | 1.0 | 1.0 | 1.0 |
| nickel dibutyl dithiocarbamate (antioxidant) | 1.0 | 1.0 | 1.0 | 1.0 | 1.0 | 1.0 |
| magnesium hydroxide (acid acceptor) | 0.5 | — | — | — | — | — |
| magnesium oxide (acid acceptor) | — | — | — | — | — | 5.0 |
| barium carbonate (acid acceptor) | — | 8.0 | — | — | — | — |
| sodium hydroxide (acid acceptor) | — | — | 0.3 | — | — | — |
| dipentamethenethiuram hexasulfide (accelerator) | 1.0 | 1.0 | 1.0 | 1.0 | 1.0 | — |
| sodium oxide (acid acceptor) | — | — | — | 3.0 | — | — |
| sodium carbonate (acid acceptor) | — | — | — | — | 6.0 | — |
| ethylene thiourea (cross-linking agent) | 1.5 | 1.5 | 1.5 | 1.5 | 1.5 | 2.0 |
| tetramethylthiuram monosulfide (accelerator) | — | — | — | — | — | 2.0 |

[1] High Abrasion Furnace Black

|  | Ex. 10 | Ex. 11 | Ex. 12 | Ex. 13 | Ex. 14 | Ex. 15 |
| --- | --- | --- | --- | --- | --- | --- |
| Mooney Scorch (@ 121.11° C.) (ASTM D 1646) | | | | | | |
| Minimum Viscosity (Mooney Units) | 28 | 29.5 | 28 | 28 | 29.3 | 29 |
| Time in minutes for 3 unit rise in viscosity | 11.5 | 14 | 9.3 | 20.2 | 13.8 | 12 |
| Time in minutes for 5 unit rise in viscosity | 12.8 | 16.3 | 11.1 | 12.5 | 15.2 | 14.1 |
| Time in minutes for 10 unit rise in viscosity | 14.6 | 18.4 | 13.6 | 14.1 | 18.2 | 15.8 |
| Tension Testing (ASTM D-142) | | | | | | |
| 100% Modulus (tensile strength @ 100% elongation) (p.s.i.) | 640 | 600 | 680 | 620 | 640 | 620 |
| Tensile Strength (p.s.i.) | 2080 | 1940 | 2180 | 1960 | 2020 | 2100 |
| % Elongation | 350 | 380 | 350 | 370 | 340 | 360 |
| Shore A Hardness (ASTM D 2240-68) | 75 | 72 | 76 | 74 | 75 | 74 |
| Tension Testing (aged 7 days @ 125° C.) (ASTM D 142) | | | | | | |
| 100% Modulus (tensile strength @ 100% elongation) | 1160 | 1040 | 1280 | 1120 | 1110 | 1080 |
| Tensile Strength | 1410 | 1480 | 1360 | 1420 | 1620 | 1510 |
| % Elongation | 140 | 160 | 120 | 138 | 150 | 145 |
| Shore A Hardness (ASTM D 2240-68) | 87 | 86 | 91 | 88 | 87 | 88 |
| ODR (ASTM D 2084-71 T) | | | | | | |
| Minimum Torque (inch pounds) | 10.7 | 11.8 | 10.5 | 10.8 | 12.3 | 12.8 |
| Highest Torque/Type (inch pounds) | 108/$M_H$ | 92/$M_H$ | 110/$M_H$ | 100/$M_H$ | 106/$M_H$ | 98/$M_H$ |
| Scorch Time ($t_{s2}$) (minutes to torque increase of 2 inch pounds) | 2.4 | 3.1 | 2.4 | 2.5 | 2.6 | 2.5 |
| Cure Time ($t_c90$) (minutes to 90% of full torque development) | 25 | 31 | 24 | 26 | 26 | 27 |

What I claim and desire to protect by Letters Patent is:

1. The process of cross-linking comprising heating a composition comprising at least one polymer selected from the group consisting of epichlorohydrin homopolymers, epichlorohydrin-ethylene oxide copolymers, epichlorohydrin-propylene oxide copolymers, epichlorohydrin-allylglycidyl ether copolymers, epichlorohydrin-ethylene oxide-allylglycidyl ether terpolymers, epichlorohydrin-propylene oxide-allylglycidyl ether terpolymers, epiflourohydrin homopolymers, epiflourohydrin-ethylene oxide copolymers, epiflourohydrin-propylene oxide copolymers, epiflourohydrin-ethylene oxide-allylglycidyl ether terpolymers, epiflourohydrin-propylene oxide-allylglycidyl ether terpolymers, poly(vinyl chloride), poly(vinyl chloride)-ethylene oxide copolymers, chloronated polyethylene, polychloroprene, chloronated butyl rubber, and brominated butyl rubber in the presence of: (1) an aliphatic substituted thiourea, (2) an inorganic base selected from the group consisting of metal oxides, hydroxides and carbonates of Groups Ia and IIa of the periodic table, and (3) a thiuram sulfide selected from the group consisting of an alkylthiuram sulfide and an arylthiuram sulfide.

2. The process of claim 1, wherein the halogen-containing polymer is an epichlorohydrin-ethylene oxide copolymer.

3. The process of claim 1 wherein the halogen-containing polymer is an epichlorohydrin-propylene oxide copolymer.

4. The process of claim 1, wherein the aliphatic substituted thiourea is ethylene thiourea.

5. The process of claim 1, wherein the inorganic base is magnesium oxide.

6. The process of claim 1, wherein the thiuram sulfide is tetramethylthylthiuram disulfide.

7. A composition comprising at least one polymer selected from the group consisting of epichlorohydrin homopolymers, epichlorohydrin-ethylene oxide copolymers, epichlorohydrin-propylene oxide copolymers, epichlorohydrin-allylglycidyl ether copolymers, epichlorohydrin-ethylene oxide-allylglycidyl ether terpolymers, epichlorohydrin-propylene oxide-allylglycidyl ether terpolymers, epiflourohydrin homopolymers, epiflourohydrin-ethylene oxide copolymers, epiflourohydrin-propylene oxide copolymers, epiflourohydrin-ethylene oxide-allylglycidyl ether terpolymers, epiflourohydrin-propylene oxide-allylglycidyl ether terpolymers, poly(vinyl chloride), poly(vinyl chloride)-ethylene oxide copolymers, chloronated polyethylene, polychloroprene, chloronated butyl rubber, and brominated butyl rubber cross-linked by heating in the presence of: (1) an aliphatic substituted thiourea; (2) an inorganic base selected from the group consisting of metal oxides, hydroxides, and carbonates of Groups Ia and IIa of the periodic table; and (3) a thiuram sulfide selected from the group consisting of an alkylthiuram sulfide, and an arylthiuram sulfide.

8. A cross-linkable composition comprising: (1) at least one polymer selected from the group consisting of epichlorohydrin homopolymers, epichlorohydrin-ethylene oxide copolymers, epichlorohydrin-propylene oxide copolymers, epichlorohydrin-allylglycidyl ether copolymers, epichlorohydrin-ethylene oxide-allylglycidyl ether terpolymers, epichlorohydrin-propylene oxide-allylglycidyl ether terpolymers, epiflourohydrin homopolymers, epiflourohydrin-ethylene oxide copolymers, epiflourohydrin-propylene oxide copolymers, epiflourohydrin-ethylene oxide-allylglycidyl ether terpolymers, epiflourohydrin-propylene oxide-allylglycidyl ether terpolymers, poly(vinyl chloride), poly(vinyl chloride)-ethylene oxide copolymers, chloronated polyethylene, polychloroprene, chloronated butyl rubber, and brominated butyl rubber; (2) an aliphatic substituted thiourea; (3) an inorganic base selected from the group consisting of metal oxides, hydroxides and carbonates of Groups Ia and IIa of the periodic table; and (4) a thiuram sulfide selected from the group consisting of an alkylthiuram sulfide, and an arylthiuram sulfide.

* * * * *

UNITED STATES PATENT AND TRADEMARK OFFICE
CERTIFICATE OF CORRECTION

PATENT NO. : 4,594,396
DATED : June 10, 1986
INVENTOR(S) : Dominick A. Berta

It is certified that error appears in the above-identified patent and that said Letters Patent are hereby corrected as shown below:

Column 4 - Line 44　　　　　　　Under Column <u>Ex. 3</u>

" 49　16 "

Should read　　　　　　　　　　　-- 16 --

Signed and Sealed this

*Sixteenth* Day of *September 1986*

[SEAL]

*Attest:*

DONALD J. QUIGG

*Attesting Officer*　　　*Commissioner of Patents and Trademarks*